(12) United States Patent
Fukui et al.

(10) Patent No.: US 8,538,173 B2
(45) Date of Patent: Sep. 17, 2013

(54) COMPUTER READABLE MEDIUM, APPARATUS, AND METHOD FOR ADDING IDENTIFICATION INFORMATION INDICATING CONTENT OF A TARGET IMAGE USING DECISION TREES GENERATED FROM A LEARNING IMAGE

(75) Inventors: Motofumi Fukui, Kanagawa (JP); Noriji Kato, Kanagawa (JP); Wenyuan Qi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 334 days.

(21) Appl. No.: 13/007,140

(22) Filed: Jan. 14, 2011

(65) Prior Publication Data
US 2012/0039541 A1 Feb. 16, 2012

(30) Foreign Application Priority Data

Aug. 12, 2010 (JP) ................................. 2010-180771

(51) Int. Cl.
G06K 9/68 (2006.01)
G06K 9/66 (2006.01)
G06K 9/62 (2006.01)
G06F 17/00 (2006.01)

(52) U.S. Cl.
USPC .............. 382/226; 382/159; 382/195; 706/48

(58) Field of Classification Search
USPC ......................................................... 382/226
See application file for complete search history.

(56) References Cited

U.S. PATENT DOCUMENTS

| | | | |
|---|---|---|---|
| 6,859,455 B1 * | 2/2005 | Yazdani et al. | 370/392 |
| 7,203,669 B2 * | 4/2007 | Lienhart et al. | 706/48 |
| 7,609,914 B2 * | 10/2009 | Hirai | 382/305 |
| 7,742,112 B2 | 6/2010 | Haramoto et al. | |
| 7,792,771 B2 * | 9/2010 | Samson et al. | 706/45 |
| 2007/0053563 A1 * | 3/2007 | Tu et al. | 382/128 |
| 2009/0157581 A1 * | 6/2009 | Samson et al. | 706/45 |
| 2009/0208112 A1 * | 8/2009 | Hamamura et al. | 382/195 |
| 2012/0039527 A1 * | 2/2012 | Qi et al. | 382/159 |

FOREIGN PATENT DOCUMENTS

JP 2000-353173 A 12/2000

OTHER PUBLICATIONS

Fukui et al., Multi-Class Labeling Improved by Random Forest for Automatic Image Annotation, MVA2011 IAPR Conference on Machine Vision Applications, Jun. 2011, pp. 202-205.*
Gustavo Carneiro et al., "Supervised Learning of Semantic Classes for Image Annotation and Retrieval", IEEE Transactions on Pattern Analysis and machine intelligence, Mar. 2007, pp. 394-410, vol. 29, No. 3.
Timothée Bailloeul et al., "Automatic Image Tagging As a Random Walk With Priors on the Canonical Correlation Subspace", MIR'08, Oct. 30-31, 2008, pp. 75-82.
M. Guillaumin et al., "TagProp: Discriminative Metric Learning in Nearest Neighbor Models for Image Auto-Annotation", ICCV, 2009, pp. 1-25.
Nakayama et al., "Ultra High Speed Image Annotation/Retrieval Method by Learning the Conceptual Relationship between Images and Labels"; pp. 65-70, PRMU2007-12 (Abstract).

* cited by examiner

*Primary Examiner* — David Zarka
(74) *Attorney, Agent, or Firm* — Sughrue Mion, PLLC

(57) ABSTRACT

A computer readable medium storing a program causing a computer to execute a process for adding image identification information is provided. The process includes: calculating first feature vectors for partial regions selected from a target image to be processed; and adding a piece of first identification information indicating content of the target image to the target image using a group of decision trees that are generated in advance on the basis of second feature vectors calculated for partial regions of a learning image and a piece of second identification information added to the entire learning image.

5 Claims, 10 Drawing Sheets

COMPUTER READABLE MEDIUM, APPARATUS, AND METHOD FOR ADDING IDENTIFICATION INFORMATION INDICATING CONTENT OF A TARGET IMAGE USING DECISION TREES GENERATED FROM A LEARNING IMAGE

CROSS-REFERENCE TO RELATED APPLICATIONS

This application is based on and claims priority under 35 USC 110 from Japanese Patent Application No. 2010-180771 filed Aug. 12, 2010.

BACKGROUND (i) Technical Field

The present invention relates to a computer readable medium storing a program, an image identification information adding apparatus, and an image identification information adding method.

(ii) Related Art

In recent years, studies have been made on technologies for automatically adding, to an entire image and a partial region of the image, a class label describing the content of the region. Such technologies are called "image annotation technologies", which are technologies for associating an image feature with a label having a linguistic meaning that describes the image feature. Image annotation technologies are expected to be applied to image-related applications, such as image retrieval.

SUMMARY

According to an aspect of the invention, there is provided a computer readable medium storing a program causing a computer to execute a process for adding image identification information. The process includes: calculating first feature vectors for partial regions selected from a target image to be processed; and adding a piece of first identification information indicating content of the target image to the target image using a group of decision trees that are generated in advance on the basis of second feature vectors calculated for partial regions of a learning image and a piece of second identification information added to the entire learning image. The adding includes deciding the piece of the first identification information for the target image in order to add the piece of the first identification information to the target image by multiplying a prior probability of a piece of the second identification information by a ratio between a first product and a second product, the first product being calculated by multiplying likelihood functions obtained from a proportion of the number of pieces of the second identification information that have reached individual leaves of the group of decision trees with respect to the total number of pieces of the second identification information, the second product being calculated by multiplying prior probabilities of the calculated first feature vectors, when a group of the second feature vectors and a group of the pieces of the second identification information are supplied to the group of decision trees to calculate the first and the second products.

BRIEF DESCRIPTION OF THE DRAWINGS

Exemplary embodiment(s) of the present invention will be described in detail based on the following figures, wherein.

DETAILED DESCRIPTION

Figure 1:
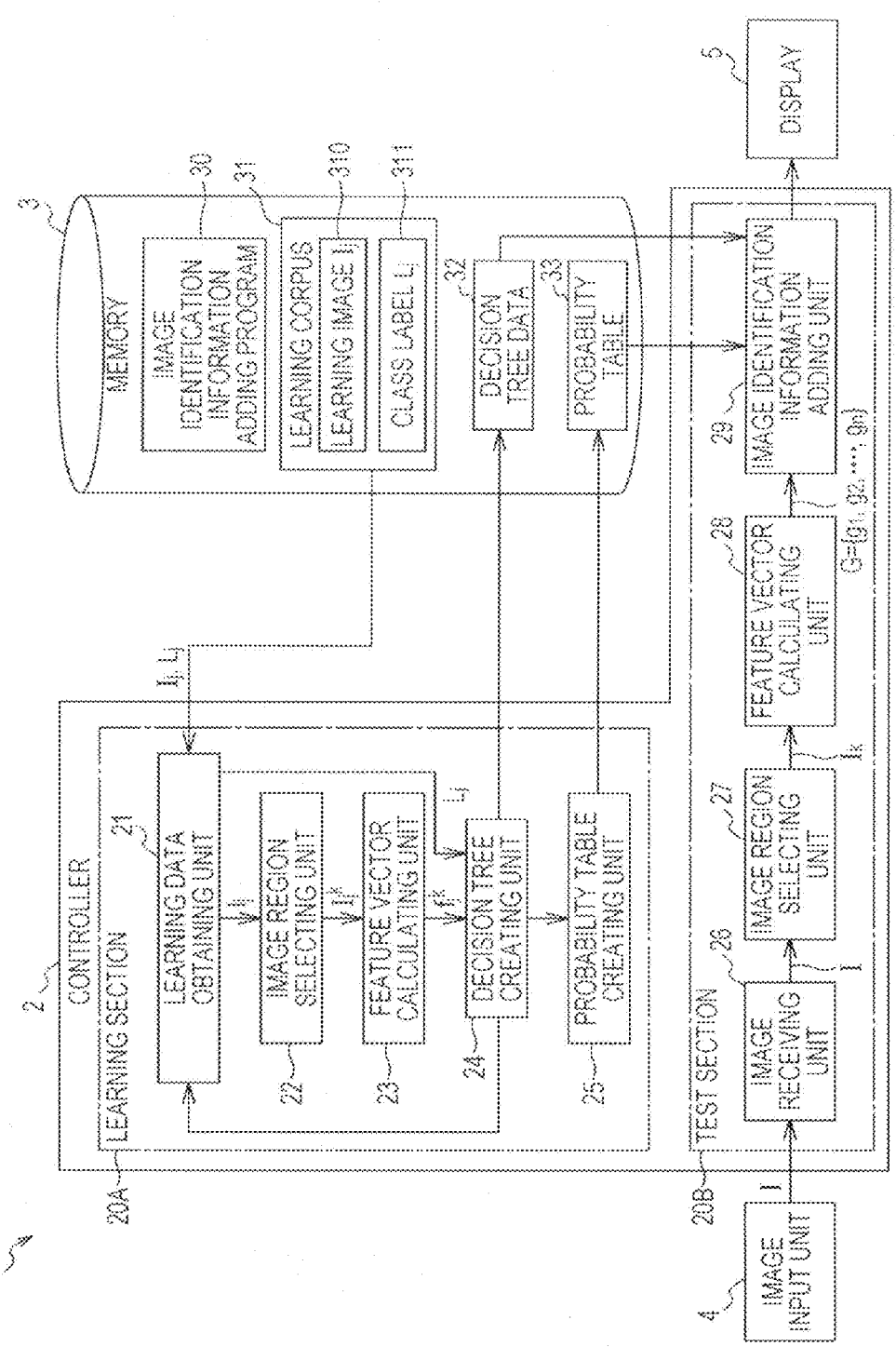
FIG. 1 is a block diagram illustrating an example of the configuration of an image identification information adding apparatus according to an exemplary embodiment of the present invention.

FIG. 1 is a block diagram illustrating an example of the configuration of an image identification information adding apparatus according to an exemplary embodiment of the present invention.

An image identification information adding apparatus 1 includes a controller 2 including a central processing unit (CPU) or the like, a memory 3 including a read only memory (ROM), a random access memory (RAM), a hard disk drive (HDD), and the like for storing various types of programs and data, an image input unit 4 such as a scanner for optically reading an image, and a display 5 such as a liquid crystal display. In this apparatus, a random forest method in which a decision tree group is used as a classifier is applied to an image annotation technology (image identification information adding technology). The random forest method is a kind of identification model suggested in the following documents: L. Breiman, "Random Forests", Machine Learning, 2001; and F. Moosman, E. Nowak, and F. Jurie, "Randomized Clustering Forests for Image Classification", TPAMI, 2008.

Regarding image annotation technologies (image identification information adding technologies), various methods have been suggested since such a technology was suggested in Japanese Unexamined Patent Application Publication No. 2000-353173. According to the method suggested in Japanese Unexamined Patent Application Publication No. 2000-353173, an image for learning (hereinafter referred to as "learning image") is divided into regions in a grid pattern (hereinafter referred to as "grid regions"), and simple feature quantities, such as color and inclination, are extracted from the individual grid regions. Subsequently, the extracted feature quantities are subjected to clustering (quantization) and grouped into several groups. At the time of a test, image features are extracted from grid regions of a test image in a similar manner, and the image features are allocated to the groups created through the prior clustering. Assuming that f represents an image feature and c represents a label, a posterior probability P(c|f) of the label c with respect to a certain grid region is calculated on the basis of the frequency of appearance of the label c in the learning image existing in the corresponding group. After that, posterior probabilities in the entire image are averaged, thereby calculating a probability P(c) of a class label with respect to the entire image. With this method, the processing time is long if the grid regions are sufficiently small, but a class label may be added to the entire image and a partial region of the image.

<Image Input Unit>

The image input unit 4 is used to input a target image (test image) to which image identification information is to be added, and is not limited to a scanner. The target image may be input via a recording medium, such as a universal serial bus (USB) memory or a compact disc read only memory (CD-ROM). Also, the target image may be input via an interface connected to a network.

<Memory>

The memory 3 stores various types of programs, such as an image identification information adding program 30, and various types of data, such as a learning corpus 31 including a pair of a learning image 310 and a class label (identification information) 311, decision tree data 32, and a probability table 33.

The learning corpus 31 includes a pair of the learning image 310 and the class label 311, and is used as learning data. Typically, the class label 311 is constituted by plural labels. The learning corpus 31 may be easily obtained as an image and a class label describing the image by using an apparatus for retrieving an image with a keyword, an electronic encyclopedia, a pair of an image in a Web document and text at the vicinity thereof, or the like. However, in the learning data collected in such a manner, the correspondence between a portion of an image and a label is not clear.

Figure 2:
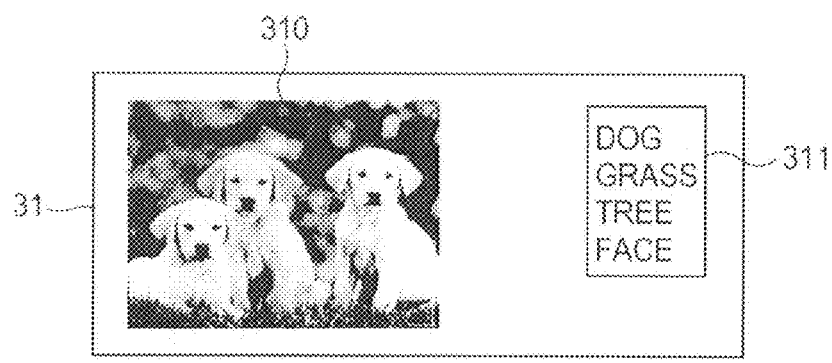
FIG. 2 is a diagram illustrating an example of a learning corpus.

FIG. 2 is a diagram illustrating an example of the learning corpus 31. Four labels "dog", "grass", "tree", and "face" are given as the class label 311 to the learning image 310, but the correspondence between each label and a portion of the learning image 310 is not determined in advance. Thus, the learning corpus 31 is handled under the assumption that the entire class label 311 describes the entire region of the learning image 310.

<Controller>

The CPU of the controller 2 operates in accordance with the image identification information adding program 30, thereby functioning as a learning section 20A including a learning data obtaining unit 21, an image region selecting unit 22, a feature vector calculating unit 23, a decision tree creating unit 24, and a probability table creating unit 25, and also functioning as a test section 20B including an image receiving unit 26, an image region selecting unit 27, a feature vector calculating unit 28, and an image identification information adding unit 29.

<Learning Data Obtaining Unit>

The learning data obtaining unit 21 is a unit that selects a learning image to be actually used for learning from collected learning data. The learning data obtaining unit 21 may select all learning images, or may select one or some of the learning images. As a method for selecting one or some of the learning images, the learning data obtaining unit 21 basically uses random selection, and it is desirable to make a selection so that necessary labels among all the class labels of the learning data are included at least once. The learning data obtaining unit 21 may use a method for performing sampling from learning images having a poor classification performance, in the case of using a decision tree that was created immediately before in the decision tree creating unit 24 described below.

<Image Region Selecting Unit>

The image region selecting unit 22 selects a predetermined number (=S in total) of image regions, serving as partial regions 310a of the learning image 310, from an image group selected by the learning data obtaining unit 21. As a method for selecting image regions, the image region selecting unit 22 may use a method for arbitrarily selecting rectangular regions of a certain size or larger, a method for selecting image regions having target points within the image at the centers thereof, or a method for dividing the learning image into regions in a grid pattern or using various types of clustering methods, thereby selecting generated partial regions. The number of image regions to be selected is not necessarily the same in individual learning images, and there may be an image in which no image region is selected.

Figure 3:
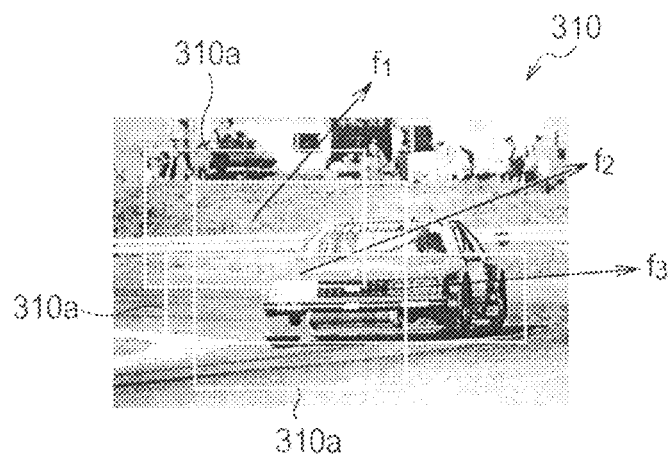
FIG. 3 is a diagram illustrating an example of selecting partial regions in an image.
Figure 4:
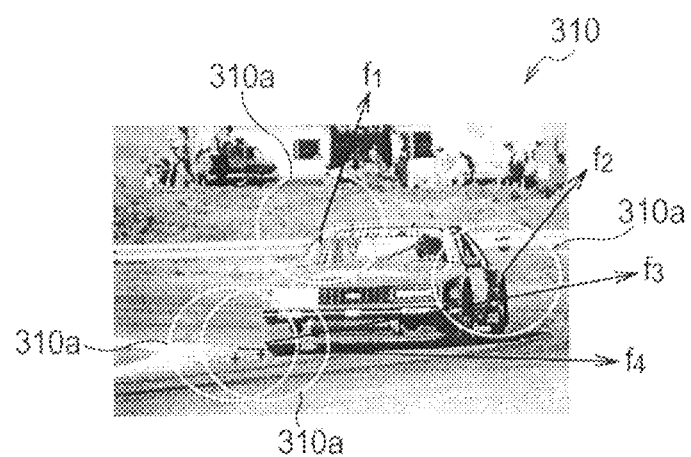
FIG. 4 is a diagram illustrating another example of selecting partial regions in an image.
Figure 5:
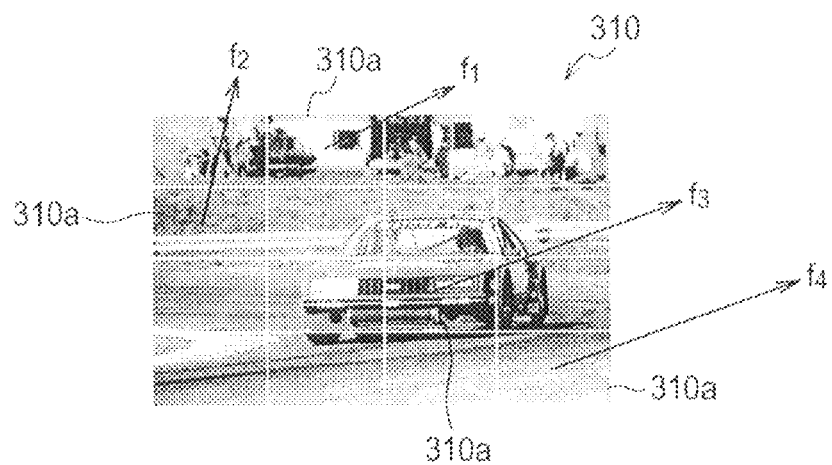
FIG. 5 is a diagram illustrating another example of selecting partial regions in an image.
Figure 6:
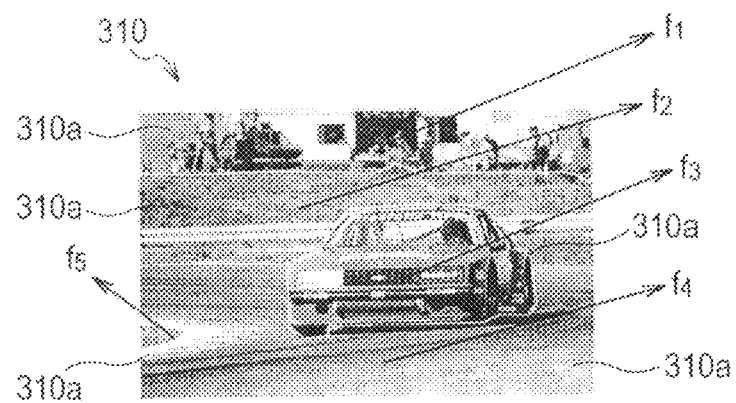
FIG. 6 is a diagram illustrating another example of selecting partial regions in an image.

FIG. 3 is a diagram illustrating an example of selecting partial regions 310a in the learning image 310, that is, an example of selecting three rectangular regions. FIG. 4 illustrates an example of selecting four partial regions 310a using circles of a predetermined radius, feature points within the learning image 310 extracted by a Harris operator (feature point extraction algorithm) being the centers of the circles. FIG. 5 illustrates an example of dividing the learning image 310 into 4×4 regions in a grid pattern and selecting four partial regions 310a from among them. FIG. 6 is a diagram illustrating an example of selecting all the five partial regions 310a generated by dividing the learning image 310.

<Feature Vector Calculating Unit>

The feature vector calculating unit 23 is a unit that extracts image features from the partial regions 310a selected by the image region selecting unit 22 and generates feature vectors f representing the features of the entire selected partial regions 310a. The extracted image features may be feature quantities of color, luminance, texture information, etc. As a method for generating a vector from an image feature, a method for using an average value of the feature quantities extracted in units of pixels may be used, or the form of a "bag of features" may be used, in which all the feature quantities are quantized and the frequency distribution thereof is calculated.

<Decision Tree Creating Unit>

The decision tree creating unit 24 creates a decision tree using a feature vector group calculated by the feature vector calculating unit 23. The decision tree creating unit 24 regards an entire class label as L, and regards a label belonging to L as $c_i$ ($0 \leq i \leq n-1$|n is the total number of labels). Also, the decision tree creating unit 24 regards a label group added to an image $I_j$ as $L_j$. For example, three labels $c_0$, $c_1$, and $c_2$ forming $L_j$ are added to the image $I_j$. At this time, $L_j$ is added as a class label also to a feature vector $f_j^k$ for the k-th partial region $I_j^k$ selected from the image $I_j$. Here, the t-th node of a decision tree $T_i$ is represented by n(i, t). t=0 means a root node. n(i, l) and n(i, r) are created from each node n(i, t). Here, l=2t+1 and r=2t+2. A learning data group that has reached the node n(i, t) is represented by $K_i^t$. At this time, the learning data group $K_i^t$ is divided into $K_i^l$ and $K_i^r$. In a decision tree, $|K_i^t|=|K_i^l|+|K_i^r|$ and $K_i^l \cap K_i^r = 0$ are satisfied. Here, |A| represents the number of pieces of data belonging to a set A. This division process is repeated until the number of pieces of data that reach the node is reduced to under a predetermined threshold constant th, which is equal to or larger than $|K_i^t|$ (i.e., $|K_i^t| \leq$ th). In general, a better performance is obtained the smaller th is (ultimately, th=1 is ideal).

Some methods have been suggested as division methods for creating a decision tree. In this exemplary embodiment, the method suggested in the above-mentioned document "Randomized Clustering Forests for Image Classification" is applied to image annotation. In this division method, the element of the m-th dimension of the feature vector $f_j^k$ is represented by $f_{j\,m}^k$, and a threshold θ and a dimension m are determined for the node n(i, t). If the element $f_{j\,m}^k$ is smaller than the threshold θ, the feature vector $f_j^k$ is distributed to $K_i^l$. Otherwise, the feature vector $f_j^k$ is distributed to $K_i^r$. At this time, the energy (Shannon entropy) at the node n(i, t) is represented by $S(K_i^t)$, which may be calculated using the following equation (1).

$$S(K_i^t) = \frac{2.0 * I(K_i^t)}{H_1(K_i^t) + H_2(K_i^t)} \quad (1)$$

Here, $H_1(K_i^t)$ represents an entropy of a label distribution of $K_i^t$, and may be expressed by the following equation (2).

$$H_1(K_i^t) = -\sum_c \frac{n_c}{|K_i^t|} \log_2 \frac{n_c}{|K_i^t|} \quad (2)$$

Here, c represents a label, and $n_c$ represents a value corresponding to the number of pieces of data to which the label c is added in $K_i^t$. $n_c$ may be the number of pieces of data itself. If the number of labels added to a certain feature vector is n, $n_c$ may be counted as 1.0/n. Also, $H_2(K_i^t)$ represents an entropy when $K_i^t$ is distributed to two nodes, and may be expressed by the following equation (3).

$$H_2(K_i^t) = -\sum_{p=1,r} \frac{|K_i^p|}{|K_i^t|} \log_2 \frac{|K_i^p|}{|K_i^t|} \quad (3)$$

Also, $I(K_i^t)$ may be expressed by the following equation (4).

$$I(K_i^t) = H_1(K_i^t) - \sum_{p=1,r} \frac{|K_i^p|}{|K_i^t|} H_1(K_i^p) \quad (4)$$

$H_1(K_i^t)$ is the maximum when the bias of all the $n_c$ is large, and $H_2(K_i^t)$ is the maximum when the number of pieces of data is the same in the right and left branches. The energy $S(K_i^t)$ is the maximum when the both conditions are satisfied from a comprehensive standpoint. The decision tree creating unit 24 selects the dimension m and threshold θ so that the energy $S(K_i^t)$ is as high as possible at the node n(i, t). The decision tree creating unit 24 does not perform division in which any of the right and left branches becomes zero. If any of the right and left branches becomes zero using every parameter, the decision tree creating unit 24 does not perform branching and regards the corresponding node as a leaf (the end of branch=leaf). The program loaded into a computer places high priority on the calculation speed, and thus sets an optimum parameter by selecting a dimension several times and then sequentially changing the threshold θ. A node is eventually terminated as a leaf, and the branching in the decision tree ends there. The number of leaves in each tree is maximized when th=1, which realizes the number of selected image regions (=S). The leaves correspond to a cluster in division of an image into regions. The decision tree creating unit 24 does not calculate distances, and is thus capable of performing calculation at high speed compared to the case of calculating distances.

The learning section 20A repeats the foregoing operation (selection of an image, selection of a region, and creation of a decision tree), thereby being capable of creating a decision tree group. The decision tree creating unit 24 stores the created decision trees as decision tree data 32 in the memory 3.

Figure 7:
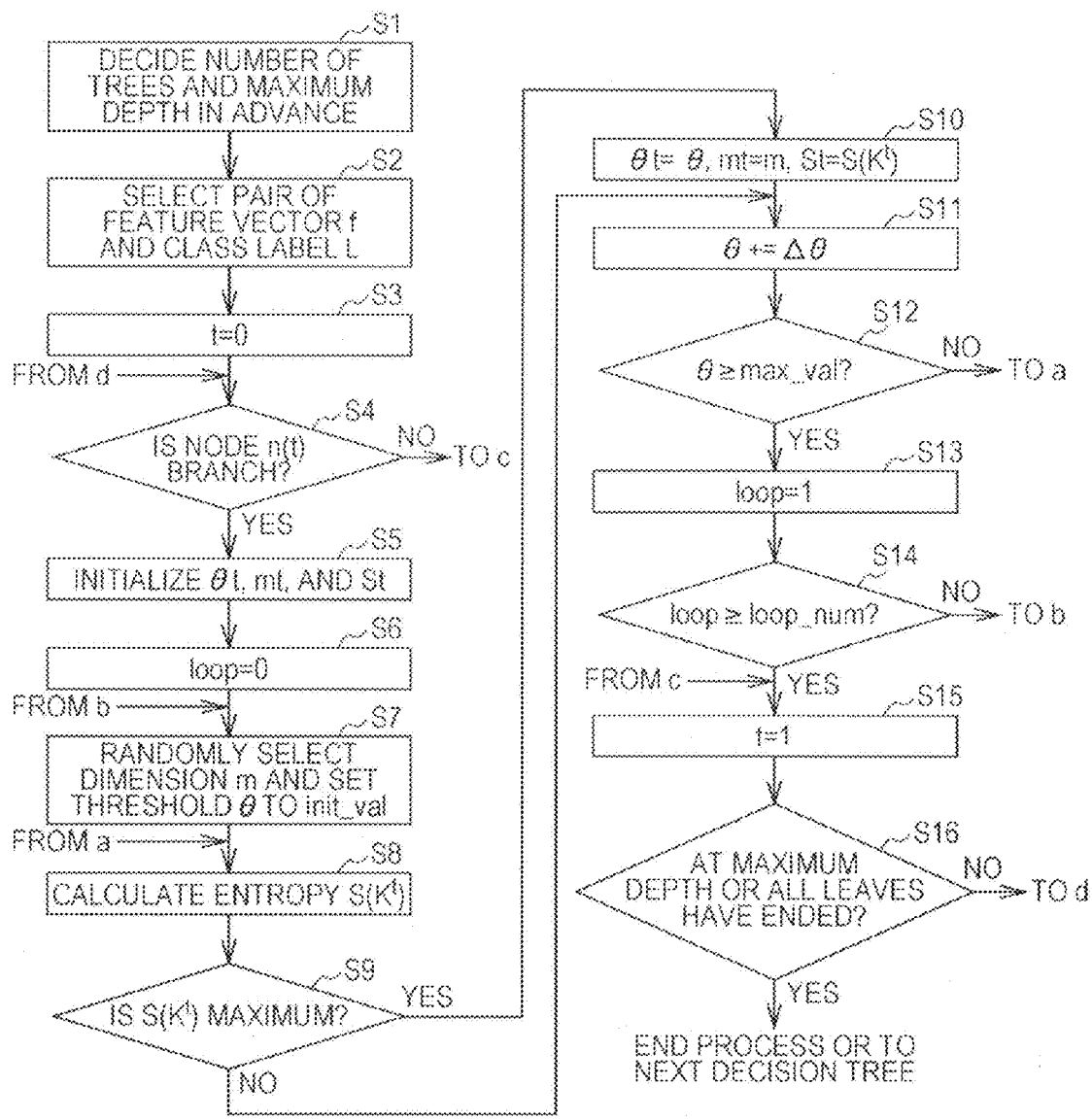
FIG. 7 is a flowchart illustrating an example of a method for creating decision trees.

FIG. 7 is a flowchart illustrating an example of a method for creating decision trees. $θ_t$ and $m_t$ are branching parameters in branches, and $S_t$ is a score corresponding to the entropy at the time. In the method for creating decision trees illustrated in FIG. 7, a minimum value of a feature element is represented by init_val, a maximum value thereof is represented by max_val, and a predetermined number of selections of a feature dimension is represented by loop_num.

The number of trees and a maximum depth are decided in advance (S1). A pair of a feature vector f and a class label L is selected (S2). t is reset to zero (S3), and it is determined whether a node n(t) is a branch or not (S4). If the node n(t) is a branch (YES in S4), $θ_t$, $m_t$, and $S_t$ are initialized (S5). Then, loop is set to zero (S6), a dimension m is randomly selected, and the threshold A is set to init_val (S7). The entropy $S(K^t)$ is calculated (S8), and whether $S(K^t)$ is the maximum or not is determined (S9). If $S(K^t)$ is the maximum (YES in S9), $θ_t$ is set to θ, $m_t$ is set to m, and $S_t$ is set to $S(K^t)$ (S10), and θ is set to Δθ(S11). Subsequently, whether θ≧max_val or not is determined (S12). If θ≧max_val (YES in S12), loop is set to one (S13), and whether loop≧loop_num or not is determined (S14). If loop≧loop_num (YES in S14), t is set to one (S15), and whether the process has reached the maximum depth or whether all the leaves have ended is determined (S16). If the process has reached the maximum depth or if all the leaves have ended (YES in S16), the process proceeds to the next decision tree. If there is no next decision tree, the process ends. By performing branching using the entropy, the number of pieces of data is substantially equal between the right and left nodes, which increases a difference in frequency distribution.

<Probability Table Creating Unit>

The probability table creating unit 25 is a unit that counts the number of labels with respect to the individual leaves of the decision tree group created by the decision tree creating unit 24. When counting the number of labels, the probability table creating unit 25 may calculate the number using all pieces of learning data or may calculate the number using samples selected in each decision tree, but in general the former brings a higher-performance result.

Figure 8:
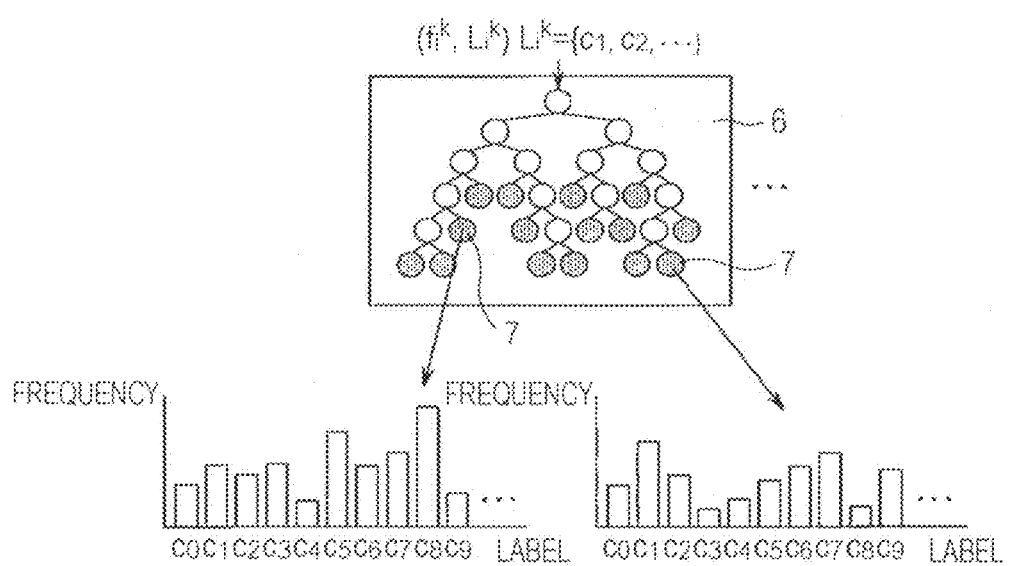
FIG. 8 is a diagram illustrating an example of a method for creating a probability table.

FIG. 8 is a diagram illustrating an example of a method for creating a probability table (probability list), and illustrates a decision tree 6 and the frequency distributions of class labels in specific leaves 7 therein. In the case of creating a probability table from all the learning images, the probability table creating unit 25 may calculate a specific number of rectangular regions in each image of a learning data group as described above, or may select all the regions calculated as a result of dividing an image into the regions. When all the obtained feature vectors and accompanying class labels are supplied to individual decision trees, the probability table creating unit 25 counts the number of labels in the leaves 7. There is a label having a frequency of zero when the table is created, but the probability table creating unit 25 may add a certain value α (sufficiently smaller than one in ordinary cases) to the frequency of all the labels in order to prevent over-learning.

Figure 9:
FIG. 9 is a diagram illustrating an example of a probability table.

FIG. 9 illustrates an example of a probability table 33. The frequencies of labels $C_1, C_2, \ldots,$ and $C_n$ of individual leaves $1^1, 1^2, \ldots,$ and $1^n$ are recorded.

<Image Identification Information Adding Unit>

The image identification information adding unit 29 is a unit that calculates the probability of a class label for individual feature vectors extracted from a target image (test image) to which an annotation (identification information) is to be added. When selecting a region from the test image, the image identification information adding unit 29 uses the same region selection method as that in the learning, and also uses the same feature as that in the learning as an image feature selected from the region. A feature vector group extracted from a test image I is represented by $G=\{g_1, g_2, \ldots, \text{and } g_n\}$. Here, $g_k$ represents a feature vector extracted from a partial image region $I^k$ of the test image I. The probability to be obtained by the image identification information adding unit 29 is P(c|G), and the label c with P(c|G) of a large value is regarded as a result of annotation.

When a single feature vector is extracted from a single image, the image identification information adding unit 29 calculates the leaf of the decision tree which the feature vector reaches, and determines the frequency distribution of a class label on the leaf, thereby deciding a class label. On the other hand, when plural feature vectors are extracted from a single image, identification may be performed in the individual regions and the average thereof may be calculated, but it is difficult to obtain a high-performance result.

According to the related art, it is normal to calculate a posterior probability P(c|g) in the case of applying the random forest method to image classification. A set of posterior probabilities P(c|G) may be expressed by the following equation (5) for averaging the posterior probabilities of class labels of individual partial regions, when the number of partial regions is represented by n and each of feature vectors is represented by g (the number is n).

$$P(c \mid G) = \frac{1}{n} \sum_i P(c \mid g_i) \quad (5)$$

The posterior probability P(c|g) may be expressed by the following equation (6) in the case of using decision trees the number of which is T.

$$P(c \mid g) = \frac{1}{T} \sum_t P(c \mid l^t) \quad (6)$$

Here, $l^t$ represents the leaf node which the feature vector g reaches in the t-th decision tree. The posterior probability on the right side of equation (6) may be easily calculated using the probability table corresponding to the foregoing $l^t$. The above-described method is an ordinary random forest method, but the performance is unstable because the independence of a different leaf is not ensured.

For this reason, the image identification information adding unit 29 does not calculate the posterior probability P(c|g) but directly calculates a likelihood function P(g|c). Accordingly, a set of posterior probabilities P(c|G) may be expressed by the following equation (7) on the basis of Bayes' theorem and the independence of a feature vector.

$$P(c \mid G) = \Lambda = \frac{P(g_1 \mid c)P(g_2 \mid c) \Lambda P(g_n \mid c) * P(c)}{P(g_1)P(g_2) \Lambda P(g_n)} = \frac{P(c) * \prod_i P(g_i \mid c)}{\prod_i P(g_i)} \quad (7)$$

In equation (7), the prior probability P(c) of a class label may be easily calculated from a label distribution of learning data. For example, the prior probability P(c) may be calculated by dividing the number of learning images accompanying a label c by the total number of learning images. Also, the prior probability P(g) of each feature vector may be expressed by the following equation (8) when the total number of labels of learning data is represented by Total_Label_Num and the total number of labels of learning data that reaches the end leaf $l^t$ is represented by Label_Num($l^t$).

$$P(g) = \frac{1}{T} \sum_t \frac{\text{Label\_Num}(l^t)}{\text{Total\_Label\_Num} * w(l^t)} \quad (8)$$

In equation (8), an addition term corresponds to the quotient obtained by dividing the proportion of the number of labels accompanying the learning data that reaches the corresponding end leaf with respect to the total number of labels by $w(l^t)$. Here, $w(l^t)$ is a weighting coefficient that is based on the volume of the leaf. Also, the likelihood function P(g|c) may be expressed by the following equation (9) when the total number of labels c of the learning data existing in the leaf $l^t$ is represented by Label_Num(c, $l^t$) and the total number of labels c of the learning data is represented by Total_Label_Num(c).

$$P(g \mid c) = \frac{1}{T} \sum_t \frac{\text{Label\_Num}(c, l^t)}{\text{Total\_Label\_Num}(c) * w(l^t)} \quad (9)$$

In equation (9), an addition term corresponds to the quotient obtained by dividing the proportion of the frequency of labels c accompanying the learning data that reaches the corresponding end leaf with respect to the entire frequency of labels c by $w(l^t)$. The frequency in equation (8) and equation (9) may be easily calculated using the probability table created by the probability table creating unit 25, and the image identification information adding unit 29 may calculate a posterior probability P(c|g).

<Method for Calculating Posterior Probability According to First Exemplary Modification>

Figure 10:
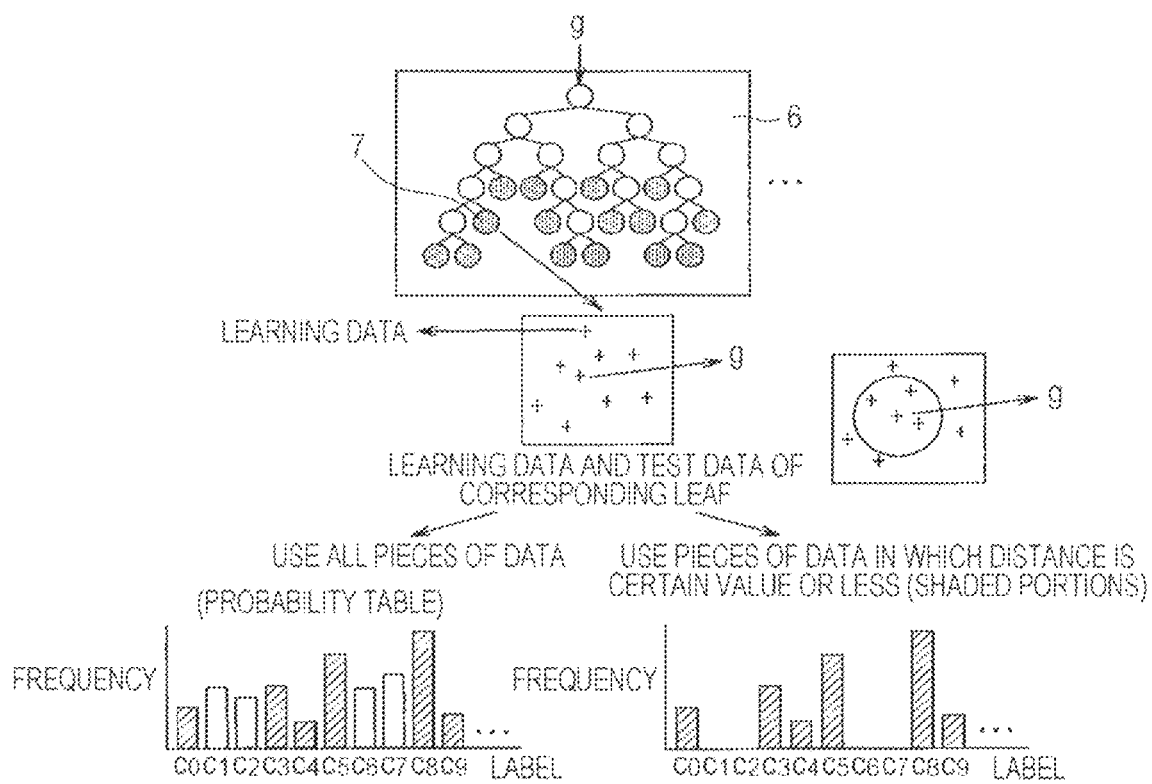
FIG. 10 is a diagram illustrating an example of a method for calculating a posterior probability.

FIG. 10 is a diagram illustrating a method for calculating a posterior probability according to a first exemplary modification. In this exemplary modification, only learning data in which the distance from a feature vector g is a certain value or less in the corresponding leaf 7 may be taken into consideration as illustrated in FIG. 10, instead of simply using the foregoing probability table.

<Method for Calculating Posterior Probability According To Second Exemplary Modification>

Figure 11:
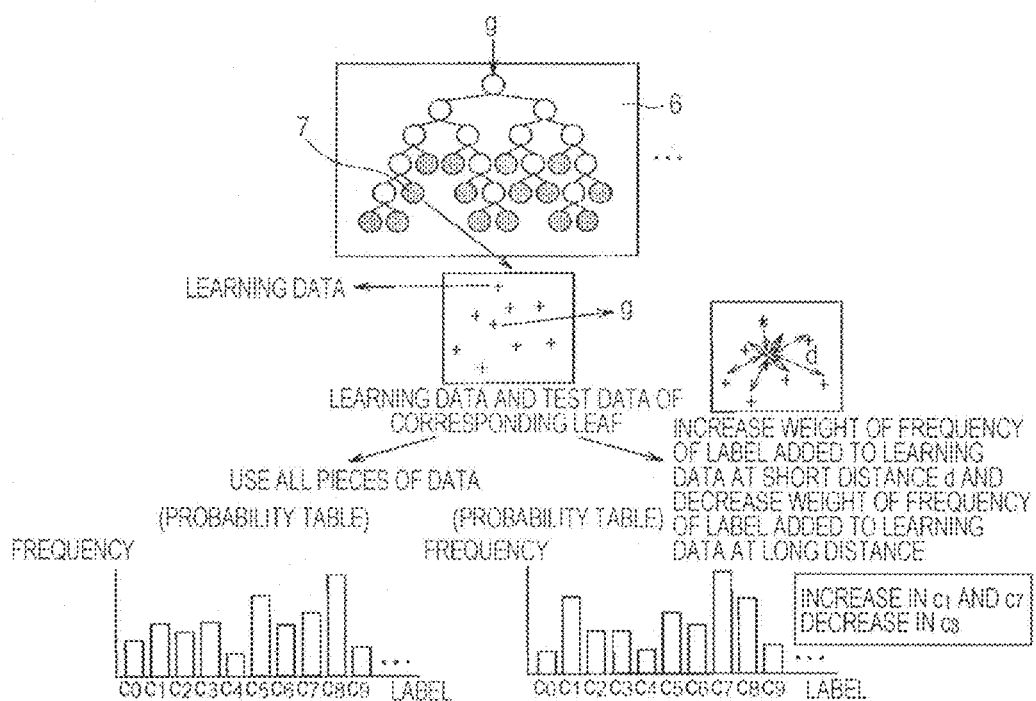
FIG. 11 is a diagram illustrating another example of a method for calculating a posterior probability.

FIG. 11 is a diagram illustrating a method for calculating a posterior probability according to a second exemplary modification. As illustrated in FIG. 11, in the case of calculating the frequencies of labels in the corresponding leaf 7, a weight may be added in accordance with the distance from a feature vector g. If a decision tree has a sufficient depth and if the number of leaves therein is sufficient, the image identification information adding unit 29 may set all the values to a certain value under the assumption that the value of $w(l^t)$ is independent of a leaf. This case is equivalent to equation (5).

Also, according to another example, it is assumed that the number of feature vectors for learning existing in the leaf $l^t$ is k ($f_1, f_2, \ldots$, and $f_k$ in order), and $w(l^i)$ may be defined by the following equation (10).

$$w(l^i) = \frac{1}{Z_k C_2} \sum_{1 \le i < j \le k} d(f_i, f_j)^n \qquad (10)$$

Here, $d(f_i, f_j)^n$ represents a distance function, and Z represents a normalization term. Also, $w(l^i)$ may be defined by the following equation (11).

$$w(l^i) = \frac{1}{Z} \max_{1 \le i < j \le k} d(f_i, f_j)^n \qquad (11)$$

Alternatively, $w(l^i)$ may be determined in accordance with a median. In a classifier using a decision tree, a threshold is determined at a branch node, and thus the volume of a leaf may be directly estimated. Here, n represents the number of dimensions of a feature vector. When many image regions exist, the value of equation (7) is small, and thus logarithmic likelihood is calculated in the case of evaluating a posterior probability. At that time, if a raising constant α of the probability table is introduced, the probability P(g|c) does not become zero, and thus a posterior probability for a label of a low frequency of appearance may also be evaluated.

With the above-described method, the image identification information adding unit 29 calculates a likelihood function P(g|c) for each partial region selected from an image, calculates a posterior probability P(c|g) using Bayes' theorem, and selects labels c having a threshold or larger or a certain number of labels c having the highest values, thereby being able to add an annotation to the partial region. Furthermore, the image identification information adding unit 29 totalizes the results using equation (7), thereby being able to calculate a set of posterior probabilities P(c|G) and to add labels to the entire image in a similar manner.

<Operation of Image Identification Information Adding Apparatus>

Figure 12:
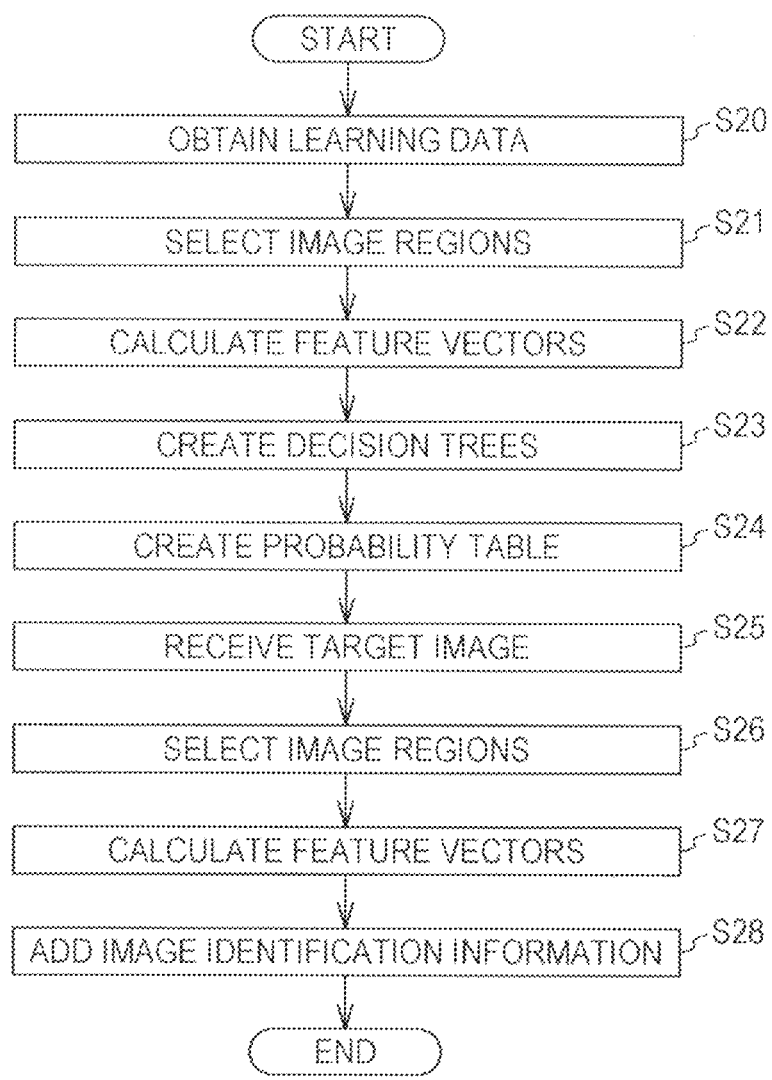
FIG. 12 is a flowchart illustrating an example of operation of the image identification information adding apparatus according to the exemplary embodiment of the present invention.

Next, an example of the operation of the image identification information adding apparatus 1 will be described with reference to the flowchart illustrated in FIG. 12. The description will be given of a learning stage and a test stage.

(1) Learning Stage

The learning data obtaining unit 21 obtains the whole or part of the learning corpus 31 stored in the memory 3 as learning data (S20).

The image region selecting unit 22 selects image regions serving as partial regions 310a of a learning image obtained by the learning data obtaining unit 21 (S21).

The feature vector calculating unit 23 extracts image features from the partial regions 310a selected by the image region selecting unit 22 and generates feature vectors f that represent the features of the entire partial regions 310a (S22).

The decision tree creating unit 24 creates decision trees using the feature vector group calculated by the feature vector calculating unit 23 (S23).

The probability table creating unit 25 counts the number of labels of each leaf of the decision tree group created by the decision tree creating unit 24 and records the result in the probability table 33 in the memory 3 (S24).

(2) Test Stage

When the image input unit 4 inputs a target image to the controller 2, the image receiving unit 26 of the test section 20B of the controller 2 receives the input target image (S25).

The image region selecting unit 27 selects image regions serving as partial regions of the target image received by the image receiving unit 26 (S26).

The feature vector calculating unit 28 extracts image features from the partial regions selected by the image region selecting unit 27, generates feature vectors g representing the features of the entire partial regions, and outputs them to the image identification information adding unit 29 (S27).

The image identification information adding unit 29 performs calculation in accordance with equation (8) and equation (9) using the feature vectors g output from the feature vector calculating unit 28 and the probability table 33 stored in the memory 3, performs calculation in accordance with equation (7) using the result of the foregoing calculation, and adds a class label of the highest frequency to the entire target image as image identification information (S28).

A class label to be added to a partial region of a target image may be obtained using a decision tree. In this case, the image identification information adding unit 29 obtains the class label for the partial region using the feature vectors g output from the feature vector calculating unit 28 and the decision tree data 32 stored in the memory 3.

Other Embodiments

The present invention is not limited to the above-described exemplary embodiment and may be variously modified without deviating from the scope of the present invention. For example, the program according to the foregoing exemplary embodiment may be provided by being stored in a recording medium, such as a CD-ROM. Also, all or part of the units 21 to 29 according to the foregoing exemplary embodiment may be realized by hardware, such as an application specific integrated circuit (ASIC). In addition, the foregoing steps described in the exemplary embodiment may be performed in different order, any of the steps may be deleted, or another step may be added to the steps.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for adding image identification information, the process comprising:

calculating first feature vectors for partial regions selected from a target image to be processed; and adding a piece of first identification information indicating content of the target image to the target image using a group of decision trees that are generated in advance on the basis of second feature vectors calculated for partial regions of a learning image and a piece of second identification information added to the entire learning image, wherein the adding the piece of the first identification information includes determining the piece of the first identification information to be added to the target image by multiplying a prior probability of a piece of the second identification information by a ratio between a first product and a second product, the first product being calculated by multiplying likelihood functions obtained from a proportion of the number of pieces of the second identification information that have reached individual leaves of the group of decision trees with respect to the total number of pieces of the second identification information, the second product being calculated by multiplying prior probabilities of the calculated first feature vectors, when a group of the second feature vectors and a group of the pieces of the second identification information are supplied to the group of decision trees to calculate the first and the second products.

2. The non-transitory computer readable medium according to claim 1, wherein the adding the piece of the first identification information includes determining the piece of the first identification information to be added to the target image by performing weighting in accordance with the pieces of the second identification information that have reached the individual leaves of the group of decision trees.

3. The non-transitory computer readable medium according to claim 1, wherein the adding the piece of the first identification information includes determining pieces of the first identification information for the partial regions of the target image and adding the pieces of the first identification information to the partial regions on the basis of the calculated first feature vectors and the group of decision trees.

4. An image identification information adding apparatus comprising:
   a processor; and
   a memory comprising:
      a feature vector calculating unit that calculates first feature vectors for partial regions selected from a target image to be processed; and
      an image identification information adding unit that adds a piece of first identification information indicating content of the target image to the target image using a group of decision trees that are generated in advance on the basis of second feature vectors calculated for partial regions of a learning image and a piece of second identification information added to the entire learning image,
   wherein the image identification information adding unit decides the piece of the first identification information for the target image in order to add the piece of the first identification information to the target image by multiplying a prior probability of a piece of the second identification information by a ratio between a first product and a second product, the first product being calculated by multiplying likelihood functions obtained from a proportion of the number of pieces of the second identification information that have reached individual leaves of the group of decision trees with respect to the total number of pieces of the second identification information, the second product being calculated by multiplying prior probabilities of the calculated first feature vectors, when a group of the second feature vectors and a group of the pieces of the second identification information are supplied to the group of decision trees to calculate the first and the second products.

5. An image identification information adding method comprising:
   calculating, performed by a processor, first feature vectors for partial regions selected from a target image to be processed; and
   adding, performed by the processor, a piece of first identification information indicating content of the target image to the target image using a group of decision trees that are generated in advance on the basis of second feature vectors calculated for partial regions of a learning image and a piece of second identification information added to the entire learning image,
   wherein the adding the piece of the first identification information includes determining the piece of the first identification information to be added to the target image by multiplying a prior probability of a piece of the second identification information by a ratio between a first product and a second product, the first product being calculated by multiplying likelihood functions obtained from a proportion of the number of pieces of the second identification information that have reached individual leaves of the group of decision trees with respect to the total number of pieces of the second identification information, the second product being calculated by multiplying prior probabilities of the calculated first feature vectors, when a group of the second feature vectors and a group of the pieces of the second identification information are supplied to the group of decision trees to calculate the first and the second products.

* * * * *